United States Patent Office 2,947,661
Patented Aug. 2, 1960

2,947,661

ADDUCT OF 1,2-DIBROMO-3-CHLOROPROPANE AND THIOUREA

Thomas Robert Hopkins and Paul Donovan Strickler, Johnson County, Kans., assignors to Spencer Chemical Company, Kansas City, Mo., a corporation of Missouri No Drawing. Filed Oct. 16, 1958, Ser. No. 767,519

5 Claims. (Cl. 167—22)

This invention relates to compositions of matter. More particularly, this invention is concerned with a novel composition of matter and the use of the same as a soil fumigant and as a plant food source.

1,2-dibromo-3-chloropropane is known to be a nematocide and is used commercially for this purpose. This chemical, however, is a volatile liquid with a high vapor pressure. It is also corrosive and quite toxic. Because of these characteristics it is difficult to transport and requires especial care in utilization. What is needed is a novel composition having the nematocidal activity of 1,2-dibromo-3-chloropropane but which is an improvement over some, if not all, of the undesirable characteristics of this substance.

According to the present invention there is provided, as a novel composition of matter, the thiourea adduct of 1,2-dibromo-3-chloropropane. This adduct when applied to soil has been found to have nematocidal activity no less, and indications are that it is greater, than 1,2-dibromo-3-chloropropane.

The thiourea adduct of 1,2-dibromo-3-chloropropane is a solid with a vapor pressure lower than 1,2-dibromo-3-chloropropane so that it is more readily handled, shipped, stored and used than is 1,2-dibromo-3-chloropropane. The adduct is also more soluble in water and thus will penetrate deeper into the soil to reach nematodes at lower depths. The adduct is also a source of fertilizer because of its thiourea content and, accordingly, will give an increased plant stand.

The adduct is readily produced by bringing together thiourea and 1,2-dibromo-3-chloropropane under liquid reaction conditions. Since 1,2-dibromo-3-chloropropane is a liquid at room temperature it may be employed in excess to serve both as the reaction medium and reactant. It is advisable, however, to combine the reactants in a suitable organic solvent such as a lower alcohol and particularly methanol. With methanol as the solvent, thiourea may be added until the methanol is saturated and then 1,2-dibromo-3-chloropropane added in liquid form. To facilitate precipitation of the adduct, 1,2-dibromo-3-chloropropane should be present in an amount considerably in excess of that which will combine with the thiourea. Thus, a ratio of about four moles or more of 1,2-dibromo-3-chloropropane to one mole of thiourea is recommended to obtain suitable yields in the form of a precipitate. The addition of benzene to the reaction mixture also induces precipitation. The product is readily isolated by filtration. It may be washed with benzene for obtaining increased purity. The following examples illustrate the preparation of the adduct.

Example 1

103.1 grams of 97% pure 1,2-dibromo-3-chloropropane (equivalent to 0.424 mole of the pure halide) was added, by means of a pipette, to 83.8 grams of a thiourea saturated methanol solution (equivalent to 0.132 mole of thiourea). A precipitate began forming after about one-half of the 1,2-dibromo-3-chloropropane had been added. The mixture was stirred and 12.3 grams of the adduct removed by filtration. The adduct was then washed with 200 ml. of benzene and air dried to yield 7.9 grams of pure adduct. Based on the ratio of 3.8 moles of thiourea per mole of the halide in the adduct, 4.2% of the halide present was adducted. The product was isolated by filtration. More adduct was obtained from the filtrate which cooled during filtration. This increased the conversion to 6.4%.

Example 2

The procedure of Example 1 was followed in a series of runs using various mole ratios of thiourea to 1,2-dibromo-3-chloropropane. The adduct formed in some of the runs was also benzene washed. The pertinent data of these runs is reported in the following table which shows that the adduct forms with a definite ratio of thiourea to 1,2-dibromo-3-chloropropane.

| Run No. | Weight $(NH_2)_2CS$ Satd. $CH_3OH$ Soln. (Grams) | Moles $(NH_2)_2CS$ | Weight $C_3H_5Br_2Cl$ (Grams) | Moles $C_3H_5Br_2Cl$ | Mole Ratio, $\frac{C_3H_5Br_2Cl}{(NH_2)_2CS}$ in Reaction Mix. | Adduct Analysis Unwashed O/ON | Unwashed $\frac{(NH_2)_2CS}{C_3H_5Br_2Cl}$ Ratio | Benzene Washed O/ON | Benzene Washed $\frac{(NH_2)_2CS}{C_3H_5Br_2Cl}$ Ratio |
|---|---|---|---|---|---|---|---|---|---|
| 1 | 21.0 | 0.033 | 10.4 | 0.0439 | 1.32 | 16.7 | 2.57 | ----- | ----- |
| 2 | 21.0 | 0.033 | 20.7 | 0.0875 | 2.65 | 16.4 | 2.49 | 17.5 | 2.81 |
| 3 | 21.0 | 0.033 | 30.7 | 0.1300 | 3.44 | 16.1 | 2.41 | 18.2 | 2.95 |
| 4 | 21.0 | 0.033 | 40.7 | 0.1730 | 5.25 | 15.0 | 2.07 | 17.5 | 2.81 |
| 5 | 21.0 | 0.033 | 10.2 | 0.0432 | 1.31 | 17.5 | 2.81 | ----- | ----- |
| 6 | 21.0 | 0.033 | 20.5 | 0.0867 | 2.62 | 16.2 | 2.45 | 17.7 | 2.87 |
| 7 | 21.0 | 0.033 | 30.7 | 0.1300 | 3.94 | 15.5 | 2.25 | 17.7 | 2.87 |
| 8 | 21.0 | 0.033 | 40.9 | 0.1730 | 5.25 | 15.1 | 2.15 | 17.7 | 2.87 |

The novel adduct of this invention may be used in the control of plant nematodes by applying it to the soil at applications of from 10 to 100 pounds per acre. It may be applied both before and after plant growth.

Although the adduct may be applied by itself as a dust, it is generally advisable to first combine it with a suitable dispersant or carrier. Liquid carriers may be employed but solvency of the adduct is to be avoided since it would thereby revert to two separate components. Solid carriers in the form of powders and granules are preferred for facilitating distribution of the adduct. Clay is a typical carrier which may be used.

Various changes and modifications of the invention can be made and, to the extent that they are within the spirit of this invention, they are intended to be within the scope of the following claims.

What is claimed is:

1. The adduct of thiourea and 1,2-dibromo-3-chloropropane.

2. The process of forming a solid adduct of thiourea and 1,2-dibromo-3-chloropropane comprising intimately combining thiourea and 1,2-dibromo-3-chloropropane to form a said adduct in solid form and separating the adduct from the reaction mixture.

3. The process of forming a solid adduct of thiourea and 1,2-dibromo-3-chloropropane comprising intimately combining thiourea and 1,2-dibromo-3-chloropropane under liquid reaction conditions to form a said adduct in solid form and separating the adduct from the reaction mixture.

4. The adduct of thiourea and 1,2-dibromo-3-chloropropane combined with an inert carrier.

5. The method of controlling plant nematodes which comprises applying the adduct of thiourea and 1,2-dibromo-3-chloropropane to soil infested with nematodes.

References Cited in the file of this patent

UNITED STATES PATENTS 2,600,431    Rosenstein _____ June 17, 1952

OTHER REFERENCES

The California Citrograph, vol. 43, No. 9, July 1958, p. 328.

Agr. Chemicals, vol. 7, No. 11, November 1952, p. 39.